3,790,641
METHYLATION OF PHENOLS AT
ORTHO-POSITION
Akio Oshima, Hiroshi Oshima, and Takamichi Kombashiri, Kobe, Japan, assignors to Kanegafuchi Kagaku Kogyo Kabushiki Kaisha, Kitaku, Osaka, Japan
No Drawing. Filed May 11, 1971, Ser. No. 142,344
Claims priority, application Japan, May 16, 1970, 45/41,803, 45/41,804, 45/41,805; June 24, 1970, 45/55,431, 45/55,432; Sept. 11, 1970, 45/80,255, 45/80,256
Int. Cl. C07c 37/16
U.S. Cl. 260—621 R    6 Claims

ABSTRACT OF THE DISCLOSURE

Phenol, cresol or the like phenols each having at least one hydrogen atom at ortho-position, is methylated at ortho-position thereof in high selectivity by reacting with methanol using a novel catalyst system selected from at least one of the following Groups (a), (b) and (c):

(a) A combination of at least one of magnesium oxide, zinc oxide and beryllium oxide, at least one of lanthanide oxide, scandium oxide and yttrium oxide, and at least one of uranium oxide and tin oxide;

(b) A combination of at least one of scandium oxide, yttrium oxide and lanthanide oxide, and tin oxide; and (c) A combination of at least one of uranium oxide and lanthanide oxide, and active carbon.

DISCLOSURE

The present invention relates to a method of methylating at ortho-position a phenol having at least one hydrogen atom at ortho-position. In more particular, it relates to a method for the synthesis of 2,6-xylenol, which is useful as a material for producing polyphenylene oxide and the like synthetic substances, by the reaction of phenol or ortho-cresol with methanol.

It has been known as a prior art that a phenol having at least one hydrogen atom at ortho-position is methylated with methanol with the use of a metal oxide as the catalyst. However, every prior method has entailed following disadvantages: For instance, the selectivity of ortho-methylation is poor according to one of prior method where ortho-cresol is reacted with methanol to produce 2,6-xylenol at a temperature of about from 300° C. to 450° C. with the use of γ-alumina as the catalyst.

There is another prior method wherein phenol is methylated to obtain 2,6-xylenol with the use of magnesium oxide as the catalyst. However, since this latter method needs a temperature as high as about 500° C. or more, the catalyst activity tends to gradually lower owing not only to the deposition of cokes on the catalyst surface but also to successively decreasing specific surface area caused by the growth of the crystal of magnesium oxide. Moreover, the decrease of the catalyst activity due to the growth of crystal cannot be regenerated so that frequent replacement of catalyst is required within a short period of time.

There is also proposed another method whereby 2,6-xylenol is obtained by the methylation of phenol at a temperature of about from 400° C. to 500° C. in the presence of a catalyst comprising magnesium oxide and uranium oxide. This process, however, gives low yield of 2,6-xylenol and forms a great deal amount of by-products such as mesitol.

The object of the present invention is to provide an improved method whereby the above-mentioned drawbacks are eliminated in the methylation reaction with methanol of a phenol having at least one hydrogen atom at ortho-position.

The method of this invention is characterized by a novel process wherein a phenol having at least one hydrogen atom at ortho-position and methanol are contacted with at least one catalyst selected from the following groups (a), (b) and (c):

(a) A combination of at least one of magnesium oxide, zinc oxide and beryllium oxide, at least one of lanthanide oxides having atomic number of from 57 to 71 in the Periodic Table, scandium oxide and yttrium oxide, and at least one of uranium oxide and tin oxide;

(b) A combination of at least one of scandium oxide, yttrium oxide and lanthanide oxides having atomic number of from 57 to 71 in the Periodic Table, and tin oxide; and (c) A combination of at least one of uranium oxide and lanthanide oxides having atomic number of from 57 to 71 in the Periodic Table, and active carbon.

The present invention will be explained in greater detail in the following description:

Magnesium oxide to be used as a catalyst component according to the method of this invention may be any of those commercially available magnesium oxide, or may be those obtained by the thermal decomposition of magnesium hydroxide or basic magnesium carbonate.

Zinc oxide to be used as another catalyst component may be those commercially available zinc oxide, or may be those obtained by the thermal decomposition of zinc hydroxide, zinc carbonate or zinc nitrate.

Beryllium oxide to be used as a catalyst component may also be those commercially available beryllium oxide, or may be those obtained by the thermal decomposition of beryllium hydroxide, beryllium carbonate and beryllium nitrate.

By the term lanthanide oxide is meant an oxide of an element having atomic number of from 57 to 71 in the Periodic Table, and includes, for example, oxides of lanthanum, cerium, praseodymium, neodymium, samarium and other elements. A mixture of two or more of the above lanthanide oxides may be used as well. It is also possible to use didymium oxide known as a mixture of the oxides of lanthanide elements.

Scandium oxide to be used as a catalyst component may be commercially available scandium oxide, but it is also possible to use those obtained by the thermal decomposition of scandium hydroxide and scandium nitrate.

Yttrium oxide to be used inthe catalyst according to the method of this invention may be those commercially available yttrium oxide, but those obtained by the thermal decomposition of yttrium hydroxide or yttrium carbonate or yttrium nitrate may be used as well.

Uranium oxide to be used includes uranium dioxide and triuranium octaoxide, and may be those obtained by the thermal decomposition of uranyl nitrate, uranyl acetate and the like salts.

Tin oxide to be used includes stannic oxide and stannous oxide or those obtained by the thermal decomposition of stannous acetate and the like salts.

Active carbon to be used as a catalyst component is preferably obtained as a commercial product.

The catalyst to be used in accordance with the process of this invention is prepared by a variety of known methods, for instance, by mechanically mixing the components to be employed, or by a method comprising adding water-insoluble metal oxides to a mixed aqueous solution of water-soluble salts such as uranyl nitrate and cerium nitrate, evaporating water under agitation followed by thermal decomposition to form the mixed oxides. In case when all the nitrates of metals to be used are water-soluble, the oxide may be obtained by adding aqueous ammonia to the mixed aqueous nitrate solution to form precipitate which is then thermally decomposed into the corresponding oxide. The catalyst may be prepared in accordance with any one of these methods as illustrated above. Activity and selectivity of the catalyst so prepared will not be significantly influenced depending upon the difference in the method for its preparation.

When the catalyst may be finally formed into cylindrical pellets, it is preferable to add a small quantity of fine particles of graphite or fatty acid magnesium salts so as to facilitate the forming operation as well as to prevent the pulverization of the catalyst.

The composition of the catalyst may vary over wide range. However, a relatively high activity can be obtained by suitably selecting the ratio among each component of the metal oxide to be used. For example, in case of using the catalyst system of Group (a) comprising (A) at least one of magnesium oxide, zinc oxide and beryllium oxide, (B) at least one of lanthanide oxide, scandium oxide and yttrium oxide, and (C) at least one of uranium oxide and tin oxide, it is preferred to employ the atomic ratio of the metals constituting the catalyst of $B/A=0.05-0.5$, and $C/A=0.03-0.3$.

In case of using Group (b) catalyst comprising (D) at least one of scandium oxide, lanthanide oxide, yttrium oxide and (E) tin oxide, a relatively high activity can be attained by employing the atomic ratio of the metals in the catalyst composition of $E/D=0.05-0.5$.

In case of using Group (c) catalyst comprising (F) at least one of uranium oxide, lanthanide oxide and (G) active carbon, a high activity can be obtained by using a catalyst containing from 3 to 40% by weight of supported metal oxide.

As to the reaction material, either phenol or o-cresol may be used. In either case, it is possible to obtain 2,6-xylenol at high yield by the ortho-methylation with the use of methanol. When using phenol as the starting material, a certain quantity of o-cresol forms as a by-product besides 2,6-xylenol, and the o-cresol so formed may be recycled to the reaction system after recovering it together with unreacted phenol from the reaction product by distillation.

The feed ratio of methanol to phenol is not so critical and may vary over wide range. However, the reaction will proceed more readily by the use of an excess of methanol to the stoichiometric ratio. In an industrial operation, it is preferred to use from 2 to 10 moles methanol per mole of phenol.

The reaction temperatures to be used in the method of this invention usually ranges from about 450° C. to 300° C. The temperature up to 450° C. is favorable because it does not only prevent the decomposition of methanol but also avoids the growth of the catalyst crystal as much as possible. At a temperature below about 300° C., the activity of catalyst becomes poorer so that the industrial operation will become no longer practical.

The reaction may be conducted under either normal pressure or elevated pressure.

The feed rate of the reaction material will vary over wide range depending upon the reaction temperature, pressure, feed molar ratio and the other reaction conditions employed. In case where the reaction is carried out under atmospheric pressure, however, it is preferred to employ the material liquid feed rate per unit hour per unit weight of catalyst of 0.2 to 2.0 cc./(g.-cat.)(hr.).

According to the method of this invention, high reactivity of ortho-methylation is attained by the use of the specific catalyst at a temperature as low as about from 450° C. to 300° C. with long-lasting activity compared with the use of known conventional catalyst, and 2,6-xylenol is obtained at high yield with increased selectivity of ortho-methylation. Moreover, the present invention is advantageous since the yield of the by-product such as mesitol can be lowered to a great extent.

The present invention will be explained in more detail in the following working examples and comparative examples. In the tables, symbols Mg, Zn, Be, La, Ce, Pr, Nd, Sm, Y, Sc, U and Sn represent oxides of metals of magnesium, zinc, beryllium, lanthanide, cerium, praseodymium, neodymium, samarium, yttrium, scandium, uranium and tin respectively. The symbol C denotes active carbon.

EXAMPLE 1

To a solution of 22.1 g. of uranyl nitrate dissolved in 150 cc. of water, there were added 16.1 g. of magnesium oxide obtained by baking commercial basic magnesium carbonate and 15.0 g. of commercial lanthanum oxide, and the mixture was evaporated to dryness under thorough stirring. The dried mass was then baked, ground and formed into pellet-shaped catalyst which had a composition as metal atomic ratio of Mg:La:U=1:0.23:0.11.

A stainless steel reaction tube was filled with 20 cc. (26.2 g.) of the above catalyst. A feed mixture comprising phenol and methanol in the molar ratio of 1:5 was passed through the catalyst bed heated at a predetermined temperature at a liquid feed rate per unit catalyst weight per unit hour (LHSV, hereinafter referred to as the same) of 0.5 cc./(g.-cat.)(hr.) while introducing nitrogen as a carrier gas in such an amount that the partial pressure was kept at 0.2 atm.

The results of the reaction carried out at 390° C. and 420° C. are given in Table 1.

No depression of the catalyst activity was observed after operating the reaction for about 100 hours at 420° C.

EXAMPLE 2

To a solution of 39.95 g. of cerium nitrate and 22.10 g. of uranyl nitrate dissolved in 150 cc. of water, there was added 16.12 g. of magnesium oxide obtained by baking commercial basic magnesium carbonate, and the mixture was evaporated to dryness under thorough stirring. The dried mass so obtained was baked, ground and formed into given size. The reactions were carried out according to a procedure similar to that described in Example 1. The results of these experiments are given in Table 1.

EXAMPLE 3

Similar experiments were carried out by using praseodymium oxide in place of lanthanum oxide in the catalyst of Example 1. The metal atomic ratio of the catalyst of this example was Mg:Pr:U=1:0.2:0.2. Other conditions and procedures were the same as those employed in Example 1. The results of the reactions are given in Table 1.

EXAMPLE 4

The same procedures of Example 1 were carried out except that neodymium oxide was used in place of lanthanum oxide in the catalyst of Example 1. The results are given in Table 1.

EXAMPLE 5

The same procedures of Example 1 were carried out except that samarium oxide was used in place of lanthanum oxide. The results are given in Table 1.

EXAMPLE 6

Didymium oxide was used instead of lanthanum oxide of the catalyst of Example 1. The composition of didymium oxide used was consisted of 45% lanthanum oxide, 38% neodymium oxide, 11% praseodymium oxide, 4% samarium oxide and 2% other remainders. The other conditions and procedure were the same as employed in Example 1. The results of these experiments are given in Table 1.

TABLE 1

| Catalyst | Reaction temp. (° C.) | Conversion ratio of phenol (percent) | Yield (percent) of— | | | |
|---|---|---|---|---|---|---|
| | | | o-Cresol | 2,6-xylenol | Mesitol | Other by-products [1] |
| Mg-La-U | 390 | 83 | 46 | 34 | 1 | 2 |
| | 420 | 100 | 17 | 76 | 3 | 4 |
| Mg-Ce-U | 370 | 85 | 42 | 39 | 2 | 2 |
| | 390 | 100 | 12 | 81 | 4 | 3 |
| | 420 | 100 | 13 | 81 | 2 | 4 |
| Mg-Pr-U | 370 | 75 | 52 | 20 | 1 | 2 |
| | 390 | 100 | 12 | 79 | 5 | 4 |
| | 420 | 100 | 10 | 83 | 5 | 2 |
| Mg-Nd-U | 390 | 90 | 48 | 38 | 1 | 3 |
| | 420 | 100 | 13 | 79 | 3 | 5 |
| Mg-Sm-U | 390 | 96 | 12 | 76 | 7 | 5 |
| | 420 | 100 | 8 | 83 | 7 | 2 |
| Mg-Didymium-U | 390 | 90 | 38 | 49 | 1 | 2 |
| | 420 | 100 | 11 | 83 | 3 | 3 |

[1] Mainly consisted of anisoles.

The yield of each product was calculated out as follows: (hereinafter the same).

$$\text{Yield} = \frac{\text{Quantity of each product formed (mole)}}{\text{Quantity of phenol fed (mole)}} \times 100 \, (\%)$$

EXAMPLE 7

To a solution of 30.0 g. cerium nitrate and 16.6 g. uranyl nitrate dissolved in 100 cc. water, there was added 12.1 g. commercial zinc oxide, and the mixture was evaporated to dryness under thorough stirring. The dried mass was baked, ground and formed into cylindrical pellet shape. The atomic ratio in the composition of the resulted catalyst was $Zn:Ce:U=1:0.46:0.22$.

A stainless steel reaction tube was packed with 25.3 g. of the above catalyst. A liquid mixture comprising phenol and methanol in the molar ratio of 1:5 was passed by a quantitative pump through the catalyst bed heated to a predetermined temperature at LHSV of 0.5 cc./(g.-cat.) (hr.) while introducing nitrogen as a carrier gas in such a rate that the partial pressure became 0.2 atm. The results of the reactions carried out at temperatures of 370° C., 390° C. and 420° C. are given in Table 2.

TABLE 2

| Reaction temp. (° C.) | Conversion ratio of phenol (percent) | Yield (percent) of— | | | |
|---|---|---|---|---|---|
| | | o-Cresol | 2,6-xylenol | Mesitol | Other by-products [1] |
| 370 | 95 | 17 | 74 | 2 | 2 |
| 390 | 96 | 24 | 69 | 2 | 1 |
| 420 | 91 | 39 | 50 | 1 | 1 |

[1] Mainly consisted of anisoles.

EXAMPLE 8

The reactions were carried out under the same reaction conditions as employed in Example 7 using in place of cerium nitrate of the catalyst of Example 7, oxides of lanthanum, praseodymium, neodymium or samarium and didymium oxide were used as the catalyst respectively. The results obtained in the reactions at 370° C. are given in Table 3.

TABLE 3

| Catalyst | Conversion ratio of phenol (percent) | Yield (percent) of— | | | |
|---|---|---|---|---|---|
| | | o-Cresol | 2,6-xylenol | Mesitol | Other by-products [1] |
| Zn-La-U | 87 | 34 | 50 | 2 | 1 |
| Zn-Pr-U | 95 | 17 | 74 | 3 | 1 |
| Zn-Nd-U | 90 | 33 | 54 | 2 | 1 |
| Zn-Sm-U | 93 | 16 | 73 | 3 | 1 |
| Zn-Didymium-U | 93 | 29 | 61 | 2 | 1 |

[1] Mainly consisted of anisoles.

EXAMPLE 9

To a solution of 40.0 g. cerium nitrate and 22.1 g. uranyl nitrate dissolved in 100 cc. water, 16.1 g. commercial beryllium oxide was added and the mixture was evaporated to dryness under thorough stirring. The dried mass was baked, ground and formed into cylindrical pellet shape to give a catalyst composition having atomic ratio of $Be:Ce:U=1:0.143:0.068$. A stainless steel reaction tube was packed with 29.2 g. of the above catalyst and a liquid mixture comprising 1:5 mole mixture of phenol and methanol was passed through the catalyst bed heated to a predetermined temperature by means of a quantitative pump. The LHSV was 0.5 cc./(g.-cat.)(hr.) and nitrogen as a carrier gas was introduced in the quantity such that the partial pressure reached 0.2 atm. The results of reactions carried out at 390° C. and 420° C. are given in Table 4.

TABLE 4

| | | |
|---|---|---|
| Reaction temp. (° C.) | 390 | 420 |
| Conversion ratio of phenol (percent) | 87 | 100 |
| Yield of o-cresol (percent) | 44 | 8 |
| Yield of 2,6-xylenol (percent) | 39 | 83 |
| Yield of mesitol (percent) | 2 | 6 |
| Yield of other by-products (percent) [1] | 2 | 3 |

[1] Mainly considted of anisoles.

EXAMPLE 10

The reactions were carried out under the same reaction conditions as used in Example 9 except that in place of cerium nitrate of the catalyst of Example 9, there were used oxides of lanthanum, praseodymium, neodymium, samarium and didymium oxide respectively. The results of the reactions carried out at a reaction temperature of 420° C. are given in Table 5.

TABLE 5

| Catalyst | Conversion ratio of phenol (percent) | Yield (percent) of— | | | |
|---|---|---|---|---|---|
| | | o-Cresol | 2,6-xylenol | Mesitol | Other by-products [1] |
| Be-La-U | 95 | 11 | 75 | 7 | 2 |
| Be-Pr-U | 100 | 9 | 83 | 6 | 2 |
| Be-Nd-U | 95 | 8 | 78 | 7 | 2 |
| Be-Sm-U | 98 | 6 | 82 | 8 | 2 |
| Be-Didymium-U | 99 | 10 | 81 | 6 | 2 |

[1] Mainly consisted of anisoles.

EXAMPLE 11

A solution of 16.6 g. uranyl nitrate in 150 cc. water was combined with 12.1 g. magnesium oxide obtained by baking commercial basic magnesium carbonate and 4.8 g. commercial scandium oxide. The mixture was evaporated to dryness under thorough stirring. The dried mass was then baked, ground and formed into pellet. A reaction tube was packed with 20 cc. (23.0 g.) of the above catalyst and a reaction material comprising 1:5 mole mixture of phenol and methanol was passed through the catalyst bed heated at a predetermined temperature at LHSV of 0.5 cc./(g.-cat.)(hr.) and nitrogen as carrier gas was introduced in such an amount that the partial pressure was kept at 0.2 atm. The results of the reactions carried out at 390° C. and 420° C. are shown in Table 6. No depression in the catalyst activity was observed after the operation for the period of about 100 hours at 420° C.

EXAMPLE 12

To a solution of 25.2 g. yttrium nitrate and 15.8 g. uranyl nitrate dissolved in 150 cc. water, there was added 11.5 g. magnesium oxide obtained by baking commercial basic magnesium carbonate and the resulted mixture was evaporated to dryness under thorough stirring. The dried mass was then ground and formed into the catalyst shape. The experiments were carried out according to a manner similar to that employed in Example 11. The results of the reactions are given in Table 6.

EXAMPLE 13

The same procedures as described in Example 11 were conducted except that zinc oxide was used instead of magnesium oxide as the catalyst component. The results of the reactions are shown in Table 6.

EXAMPLE 14

The same procedures as described in Example 12 were carried out but using beryllium oxide instead of magnesium oxide. The results are shown in Table 6.

pressure being kept at 0.2 atm. The results of the reactions carried out at 390° C. and 420° C. are shown in Table 7.

EXAMPLE 16

The same procedures of Example 15 were carried out but using yttrium nitrate instead of cerium nitrate and zinc oxide instead of magnesium oxide. The results of the reactions are shown in Table 7.

EXAMPLE 17

The same procedures of Example 15 were carried out but using lanthanum nitrate instead of cerium nitrate and beryllium oxide instead of magnesium oxide. The results of the reactions are shown in Table 7.

TABLE 7

| Catalyst | Reaction temp. (° C.) | Conversion ratio of phenol (percent) | Yield (percent) of— | | | |
|---|---|---|---|---|---|---|
| | | | o-Cresol | 2,6-xylenol | Mesitol | Other by-products |
| Mg-Ce-Sn | 390 | 93 | 40 | 51 | 2 | 0 |
| | 420 | 99 | 21 | 74 | 3 | 1 |
| Zn-Y-Sn | 390 | 98 | 26 | 69 | 2 | 1 |
| | 420 | 94 | 30 | 62 | 1 | 1 |
| Be-La-Sn | 390 | 93 | 36 | 54 | 2 | 1 |
| | 420 | 99 | 15 | 79 | 3 | 2 |

[1] Mainly consisted of anisoles.

EXAMPLE 18

To a solution of 5.95 g. uranyl nitrate dissolved in 100 cc. water, there was added 40 cc. of commercial granular active carbon (Trade name: "Shirasagi," manufactured by Takeda Chemical Industries Ltd.), and the resulted mixture was kept standing at room temperature for 4 hours, then evaporated to dryness under thorough stirring. A stainless steel reaction tube was packed with this catalyst and it was thermally decomposed in nitrogen stream until the generation of nitrogen oxide gas discontinued. The catalyst so obtained was heated at a predetermined temperature and a reaction material comprising 1:5 molar ratio mixture of phenol and methanol was passed over the catalyst bed. The results of the reactions are shown in Table 8.

TABLE 6

| Catalyst | Reaction temp. (° C.) | Conversion ratio of phenol (percent) | Yield (percent) of— | | | |
|---|---|---|---|---|---|---|
| | | | o-Cresol | 2,6-xylenol | Mesitol | Other by-products [1] |
| Mg-Sc-U | 390 | 88 | 53 | 32 | 2 | 1 |
| | 420 | 98 | 18 | 74 | 4 | 2 |
| Mg-Y-U | 390 | 81 | 57 | 22 | 1 | 1 |
| | 420 | 97 | 22 | 71 | 2 | 2 |
| Zn-Sc-U | 390 | 98 | 24 | 71 | 2 | 1 |
| | 420 | 93 | 31 | 60 | 1 | 1 |
| Be-Y-U | 390 | 86 | 42 | 42 | 1 | 1 |
| | 420 | 99 | 14 | 81 | 3 | 1 |

[1] Mainly consisted of anisoles.

EXAMPLE 15

To a solution of 30.0 g. cerium nitrate dissolved in 150 cc. water, there were added 12.1 g. magnesium oxide obtained by baking commercial basic magnesium carbonate and 7.8 g. stannous acetate, and the mixture was evaporated to dryness under thorough stirring. After baking and grinding the dried mass, it was formed into cylindrical pellets. A reaction tube was packed with 23 cc. (23.0 g.) of the above catalyst. A liquid mixture comprising phenol and methanol at the molar ratio of 1:5 was passed over the catalyst bed heated to a predetermined temperature by means of a quantitative pump at LHSV of 0.5 cc./(g.-cat.)(hr.) while introducing nitrogen as a carrier gas in such an amount that the partial

EXAMPLE 19

The same procedure as described in Example 18 was carried out except that 10.77 g. of cerium nitrate was used instead of uranyl nitrate. The result of this experiment is given in Table 8.

EXAMPLE 20

The experiments were carried out according to the manner same as that described in Example 18 except that 10.77 g. cerium nitrate and 5.90 g. uranyl nitrate were employed. The results are given in Table 8.

EXAMPLE 21

The experiments were carried out in the same procedure as described in Example 18 except that 5.39 g. cerium nitrate and 2.98 g. uranyl nitrate were employed. The results are shown in Table 8.

EXAMPLE 22

The experiments were carried out in the same manner as described in Example 18 except that 5.4 g. lanthanum nitrate and 2.98 g. uranyl nitrate were used to 40 cc. of granular active carbon. The result is given in Table 8.

EXAMPLE 23

To a solution of 4.27 g. commercial didymium oxide dissolved in nitric acid, there were added 100 cc. aqueous solution containing 5.95 g. uranyl nitrate and granular active carbon. The other procedures employed were the same as described in Example 18. The composition of didymium oxide comprised of 24% lanthanum oxide, 33% cerium oxide, 16% praseodymium oxide, 21% neodymium oxide and 6% samarium oxide (percent by weight respectively). The results of the experiments are shown in Table 8.

EXAMPLE 25

The same experiments of Example 24 were carried out but using lanthanum nitrate in place of cerium nitrate used in the catalyst of Example 24. The results of the reactions are given in Table 9.

EXAMPLE 26

The same experiments of Example 24 were carried out but using praseodymium nitrate in place of cerium nitrate used in the catalyst of Example 24. The results of the reactions are given in Table 9.

EXAMPLE 27

The same experiments of Example 24 were carried out except that yttrium nitrate was used in place of cerium nitrate used in the catalyst of Example 24. The results of the reactions are given in Table 9.

EXAMPLE 28

The same experiments of Example 24 were carried out except that scandium nitrate was used in place of cerium

TABLE 8

| Catalyst | Reaction temp. (° C.) | LHSV (cc./g. hr.) | Conversion ratio of phenol (percent) | Yield (percent) of— | | | |
|---|---|---|---|---|---|---|---|
| | | | | o-Cresol | 2,6-xylenol | Mesitol | Other by-products [1] |
| U/C | 350 | 0.5 | 99 | 7 | 88 | 2 | 2 |
|  | 370 | 1.0 | 99 | 9 | 81 | 4 | 5 |
| Ce/C | 370 | 0.5 | 92 | 20 | 62 | 8 | 2 |
| Ce-U/C | 370 | 0.5 | 100 | 11 | 87 | 1 | 1 |
|  | 390 | 1.0 | 100 | 16 | 81 | 2 | 1 |
|  | 420 | 1.0 | 97 | 28 | 64 | 3 | 2 |
| Ce-U/C | 350 | 0.5 | 95 | 20 | 73 | 1 | 1 |
|  | 370 | 1.0 | 96 | 14 | 78 | 3 | 1 |
| La-U/C | 370 | 1.0 | 97 | 17 | 73 | 5 | 2 |
| Didymium-U/C | 350 | 0.5 | 95 | 14 | 76 | 3 | 2 |
|  | 370 | 1.0 | 94 | 17 | 70 | 5 | 2 |

[1] Mainly consisted of anisole.

EXAMPLE 24

To a solution of 66.8 g. cerium nitrate dissolved in 150 cc. water, there was added 8.4 g. stannous acetate and the mixture was evaporated to dryness under thorough stirring. The dried mass was baked, ground and formed into cylindrical pellet. A reaction tube was packed with 13 cc. (23.0 g.) of this catalyst. A liquid mixture of phenol and methanol in the molar ratio of 1:5 was passed through the catalyst bed heated at a predetermined temperature at LHSV of 0.5 cc./(g.-cat.)(hr.) while introducing nitrogen as a carrier gas in such a rate that the partial pressure was kept at 0.2 atm. The results of the reactions carried out at 370° C., 390° C. and 420° C. are shown in Table 9.

nitrate used in the catalyst of Example 24. The results of the reactions are given in Table 9.

TABLE 9

| Catalyst | Reaction temp. (° C.) | Conversion ratio of phenol (percent) | Yield (percent) of— | | | |
|---|---|---|---|---|---|---|
| | | | o-Cresol | 2,6-xylenol | Mesitol | Other by-products |
| Ce-Sn | 370 | 91 | 25 | 66 | 0 | 0 |
|  | 390 | 92 | 29 | 63 | 0 | 0 |
|  | 420 | 87 | 39 | 48 | 0 | 0 |
| La-Sn | 370 | 90 | 27 | 63 | 0 | 0 |
|  | 390 | 91 | 31 | 60 | 0 | 0 |
|  | 420 | 88 | 37 | 51 | 0 | 0 |
| Pr-Sn | 370 | 90 | 26 | 64 | 0 | 0 |
|  | 390 | 92 | 30 | 63 | 0 | 0 |
|  | 420 | 88 | 39 | 49 | 0 | 0 |
| Y-Sn | 370 | 87 | 26 | 61 | 0 | 0 |
|  | 390 | 88 | 29 | 59 | 0 | 0 |
|  | 420 | 87 | 40 | 47 | 0 | 0 |
| Sc-Sn | 370 | 90 | 28 | 62 | 0 | 0 |
|  | 390 | 92 | 31 | 61 | 0 | 0 |
|  | 420 | 87 | 37 | 50 | 0 | 0 |

EXAMPLE 29

A catalyst comprising magnesium oxide, cerium oxide, tin oxide and uranium oxide was prepared according to manners those described in Examples 2 and 15. The metal atomic ratio of the catalyst was Mg:Ce:Cn:U=1:0.23:0.06:0.05.

By using this catalyst, the reactions were carried out according to the procedure of Example 1. The results are shown in Table 10.

EXAMPLE 30

A catalyst comprising beryllium oxide, cerium oxide, scandium oxide, yttrium oxide and uranium oxide was prepared according to the procedure described in Example 9. The atomic metal ratio of the catalyst so prepared was Be:Ce:Sc:Y:U=1:.10:0.07:0.06:0.11. The reactions were carried out by using this catalyst under the same conditions as employed in Example 9. The results are given in Table 10.

EXAMPLE 31

According to the method described in Example 24, a catalyst comprising cerium oxide, scandium oxide and tin oxide having the atomic ratio of the metals of Ce:Sc:Sn=1:1:0.46 was prepared. The reactions were carried out under the same conditions as that of Example 24. The results are shown in Table 10.

EXAMPLE 32

According to the method described in Example 24, there was prepared a catalyst comprising lanthanum oxide, yttrium oxide and tin oxide. The atomic ratio of the metals in the catalyst composition was La:Y:Sn=1:1.0.46. The reaction was carried out under the same conditions as those employed in Example 24. The results of these reactions are given in Table 10.

TABLE 10

| Catalyst | Reaction temp. (° C.) | Conversion ratio of phenol (percent) | Yield (percent) of— | | | |
|---|---|---|---|---|---|---|
| | | | o-Cresol | 2,6-xylenol | Mesitol | Other by-products [1] |
| Mg-Ce-Sn-U | 390 | 75 | 16 | 55 | 3 | 1 |
| | 420 | 95 | 17 | 75 | 2 | 1 |
| Be-Ce-Sc-Y-U | 390 | 92 | 32 | 56 | 2 | 2 |
| | 420 | 96 | 22 | 71 | 2 | 1 |
| Ce-Sc-Sn | 370 | 91 | 27 | 64 | 0 | 0 |
| | 390 | 92 | 30 | 62 | 0 | 0 |
| | 420 | 87 | 35 | 52 | 0 | 0 |
| La-Y-Sn | 390 | 90 | 29 | 60 | 1 | 0 |
| | 420 | 88 | 32 | 55 | 1 | 0 |

[1] Mainly consisted of anisoles.

COMPARATIVE EXAMPLE 1

Comparative tests were carried out by using a magnesium oxide catalyst prepared by baking commercial basic magnesium carbonate. The reaction conditions employed were the same as described in Example 1. The results are given in Table 11.

COMPARATIVE EXAMPLE 2

Commercial zinc oxide was shaped and used as the catalyst. The reactions were carried out under the conditions similar to those employed in Example 7. The results are given in Table 11.

COMPARATIVE EXAMPLE 3

A catalyst comprising zinc oxide and uranium oxide was prepared according to the manner similar to that described in Example 13. The reaction conditions employed were similar to that described in Example 11. The results are given in Table 11.

COMPARATIVE EXAMPLE 4

A catalyst comprising beryllium oxide and uranium oxide was prepared according to the manner similar to Example 14. The reaction was conducted under the same conditions as employed in Example 11. The result is given in Table 11.

COMPARATIVE EXAMPLE 5

Tin oxide obtained by the thermal decomposition of stannous acetate was shaped and used as the catalyst. The reaction conditions employed were the same as those described in Example 24. The results are given in Table 11.

COMPARATIVE EXAMPLE 6

The same procedures of Example 18 were carried out except that commercial granular active carbon alone was used as the catalyst. The results are given in Table 11.

COMPARATIVE EXAMPLE 7

A catalyst consisting of magnesium oxide and lanthanum oxide was prepared according to the manner described in Example 2. The atomic ratio of the metals in the catalyst was Mg:La=1:0.23. The reactions were carried out under the same conditions as employed in Example 1. The results are shown in Table 11.

TABLE 11

| Catalyst | Reaction temp. (° C.) | Conversion ratio of phenol (percent) | Yield (percent) of— | | | |
|---|---|---|---|---|---|---|
| | | | o-Cresol | 2,6-xylenol | Mesitol | Other by-products [1] |
| Mg | 390 | 21 | 19 | 2 | 0 | 0 |
| | 420 | 38 | 33 | 5 | 0 | 0 |
| Zn | 390 | 19 | 17 | 2 | 0 | 0 |
| | 420 | 61 | 50 | 11 | 0 | 0 |
| Be | 390 | 19 | 15 | 1 | 0 | 3 |
| | 420 | 41 | 34 | 2 | 0 | 5 |
| Mg-U | 390 | 54 | 45 | 8 | 1 | 0 |
| | 420 | 92 | 50 | 39 | 2 | 0 |
| Zn-U | 390 | 53 | 40 | 13 | 0 | 0 |
| | 420 | 82 | 39 | 39 | 3 | 0 |
| Be-U | 390 | 39 | 34 | 4 | 0 | 1 |
| | 420 | 89 | 39 | 46 | 2 | 2 |
| Sn | 390 | 17 | 16 | 1 | 0 | 0 |
| | 420 | 33 | 29 | 4 | 0 | 0 |
| C | 350 | 15 | 10 | 0 | 0 | 5 |
| | 370 | 45 | 32 | 8 | 0 | 5 |
| Mg-La | 390 | 38 | 35 | 3 | 0 | 0 |
| | 420 | 59 | 50 | 9 | 0 | 0 |

[1] Mainly consisted of anisoles.

It is to be understood that the foregoing description is only illustrative of the principles of this invention. Various modifications and extensions thereof would be evident

What is claimed is:

1. Method of methylating phenol or o-cresol at the ortho-position, comprising the step of contacting said phenol or o-cresol and methanol with a catalyst consisting essentially of (1) at least one member of the group consisting of magnesium oxide, zinc oxide and beryllium oxide, (2) at least one member of the group consisting of lanthanide oxides having atomic number of from 57 to 71 in the Periodic Table, scandium oxide and yttrium oxide, and (3) at least one member of the group consisting of uranium oxide and tin oxide, said contacting being carried out at a temperature of from 300° C. to 450° C.

2. Method of claim 1, wherein said catalyst further contains fine particles of graphite or fatty acid magnesium salts.

3. Method of claim 1, wherein said catalyst comprises: (A) at least one of magnesium oxide, zinc oxide and beryllium oxide, (B) at least one of lanthanide oxide, scandium oxide and yttrium oxide, and (C) at least one of uranium oxide and tin oxide, and wherein the atomic ratios of the metals thereof are as follows: B/A=0.05 to 0.5; and C/A=0.03 to 0.3.

4. Method of claim 1, wherein 2 to 10 moles of methanol is used per mole of phenol.

5. Method of claim 1, wherein said reacting is carried out under normal pressure or elevated pressure.

6. Method of claim 1, wherein said reacting is carried out at atmospheric pressure and the liquid feed material per unit of catalyst is fed at a rate of from 0.2 to 2.0 cc./(g. cat.) hour.

References Cited

UNITED STATES PATENTS

| | | | |
|---|---|---|---|
| 3,347,936 | 10/1967 | Froitzheim et al. | 260—621 R |
| 3,598,879 | 8/1971 | Kmecak et al. | 252—463 X |
| 3,277,184 | 10/1966 | Ryland et al. | 260—621 G |

LEON ZITVER, Primary Examiner

N. MORGENSTERN, Assistant Examiner

U.S. Cl. X.R.

252—447, 462, 463